United States Patent

Yamamoto

[11] Patent Number: 5,361,883
[45] Date of Patent: Nov. 8, 1994

[54] ELECTROMAGNETIC CLUTCH

[75] Inventor: Tetsuo Yamamoto, Gunma, Japan

[73] Assignee: Ogura Clutch Co., Ltd., Gunma, Japan

[21] Appl. No.: 212,286

[22] Filed: Mar. 14, 1994

Related U.S. Application Data

[63] Continuation of Ser. No. 125,639, Sep. 22, 1993, abandoned, which is a continuation of Ser. No. 851,591, Mar. 16, 1992, abandoned.

[30] Foreign Application Priority Data

Mar. 20, 1991 [JP] Japan .................................. 3-80510

[51] Int. Cl.$^5$ ............................................. F16D 27/14
[52] U.S. Cl. ................... 192/84 C; 192/84 B; 474/174
[58] Field of Search ............... 192/84 C, 84 A, 84 B; 474/170, 174

[56] References Cited

U.S. PATENT DOCUMENTS

| 3,044,594 | 7/1962 | Bernard | 192/84 C |
| 3,082,933 | 3/1963 | Bernard | 192/84 C X |
| 4,069,572 | 1/1978 | Pierce et al. | 192/84 C X |
| 4,287,976 | 9/1981 | Sakaki et al. | |
| 4,468,210 | 8/1984 | McCutchan, Jr. | |
| 4,473,363 | 9/1984 | McCutchan, Jr. | 474/170 X |
| 4,548,592 | 10/1985 | Ohhashi et al. | 474/168 |
| 4,767,387 | 8/1988 | Matsudka et al. | 474/170 X |
| 4,913,688 | 4/1990 | Bekheet | |

FOREIGN PATENT DOCUMENTS

| 0148088 | 5/1981 | Germany | 474/170 |
| 54-142451 | 11/1979 | Japan | |
| 0014653 | 2/1981 | Japan | 474/170 |
| 58-196328 | 11/1983 | Japan | |
| 0190569 | 10/1984 | Japan | 474/170 |
| 63-139356 | 9/1988 | Japan | |
| 2112898 | 7/1983 | United Kingdom | 474/170 |

Primary Examiner—Andrea L. Pitts
Attorney, Agent, or Firm—Townsend and Townsend Khourie and Crew

[57] ABSTRACT

An electromagnetic clutch includes a rotor assembly constituted by a pulley portion and a rotor portion. The pulley portion has a pulley portion on an outer circumferential side, is axially supported on a driven shaft to be rotatable, and is designed to receive a driving force from a driving shaft. The rotor portion has an armature on a side of the driving shaft. The armature is selectively friction-engaged by magnetic attraction. The rotor portion of the rotor assembly is formed by casting to have an uneven surface shape constituted by a plurality of projections on its outer circumferential surface. The synthetic resin pulley portion is integrally coupled to the outer circumferential surface of the rotor portion by insert molding.

7 Claims, 2 Drawing Sheets

ELECTROMAGNETIC CLUTCH

This application is a continuation of U.S. patent application Ser. No. 08/125,639 filed Sep. 22, 1993, now abandoned, which is a continuation of U.S. patent application Ser. No. 07/851,591 filed Mar. 16, 1992, now abandoned.

BACKGROUND OF THE INVENTION

The present invention relates to an electromagnetic clutch used for an automobile air-conditioner or the like and, more particularly, to an improvement in an electromagnetic clutch having a synthetic resin pulley integrally formed on a rotor.

An electromagnetic clutch of this type is disclosed in, e.g., Japanese Patent Laid-Open No. 58-196328, in which a synthetic resin driving member is integrally mounted on a rotor. More specifically, in this conventional device, an annular gear as a resin driving member is fixed on the outer circumferential surface of the rotor in the following manner. In consideration of the possibility that the rotor might be deformed if grooves are axially formed in the outer circumferential surface of the rotor by component rolling, a plurality of grooves are formed in the outer circumferential surface of the rotor by pressing the rotor into a jig having a plurality of cutting tools fixed thereto along the circumferential direction. The resin annular gear is then fitted on the outer circumferential surface of the rotor having such grooves formed therein. With this structure, while slipping of the annular gear on the rotor is prevented, the two components are integrally formed.

In such a conventional structure, however, the rotor and the resin annular gear, which are separately formed, are simply fitted together to be integrally rotatable in such a manner that the grooves formed in the rotor surface by the above-mentioned cutting tools are meshed with the projections of the resin gear. This structure requires the resin annular gear to have a considerably high strength and hence poses a problem in terms of practicability.

Under the circumstances, in order to reliably form the above-described rotor and resin driving member into an integral part, the present applicant has considered the process of forming an annular rotor having a U-shaped cross-section by cold forging, forming projections on the outer circumferential surface of the rotor by knurling, and integrally forming a synthetic resin pulley as a driving member by insert molding.

As, however, additional processing operations such as component rolling, cutting, and knurling are required to integrally form the above-described rotor and synthetic resin pulley, poor productivity cannot be avoided. Therefore, an electromagnetic clutch cannot be provided at a low cost.

In addition, limitations are imposed on the pulley diameter of an electromagnetic clutch, as the automobile manufacturers demand a reduction in size of the electromagnetic clutch. On the other hand, it is required that the thickness of a resin pulley be increased to a certain degree in order to ensure its rigidity. Consequently, the outer diameter of such a rotor is reduced, and only a small number of cutting tools can be arranged with respect to the small-diameter outer circumferential surface of the rotor. As a result, the groove/projection engaging portions of the rotor and the pulley are reduced in number, posing a problem in terms of durability.

As described above and explained in the above-mentioned Japanese Patent Laid-Open No. 58-196328, in component rolling or the like, a rotor may be deformed to interfere with a field core. Therefore, it is required that some measures be taken to solve all these problems.

SUMMARY OF THE INVENTION

It is an object of the present invention to provide an electromagnetic clutch in which a rotor assembly having a resin pulley integrally coupled to a rotor is formed by simple molding processing to have a required strength and greatly improve productivity of the rotor assembly.

In order to achieve the above object, according to the present invention, there is provided an electromagnetic clutch comprising a rotor assembly constituted by a pulley portion on an outer circumferential side, axially supported on a driven shaft to be rotatable and designed to receive a driving force from a driving shaft, and a rotor portion having an armature on a side of the driving shaft, the armature being selectively friction-engaged by magnetic attraction, wherein the rotor portion of the rotor assembly is formed by casting to have an uneven surface shape constituted by a plurality of projections on an outer circumferential surface thereof, and the synthetic resin pulley portion is integrally coupled to the outer circumferential surface of the rotor portion by insert molding.

According to the present invention, an uneven surface consisting of a plurality of projections is formed, by plastic processing, on the outer circumferential surface of a rotor obtained by casting, and the resultant structure is processed by insert molding to form a synthetic resin pulley portion integrally coupled to the outer circumferential surface. With this structure, the coupling strength between the rotor and the resin pulley portion can be ensured, and the productivity can be improved.

DESCRIPTION OF THE PREFERRED EMBODIMENT

Figure 1:
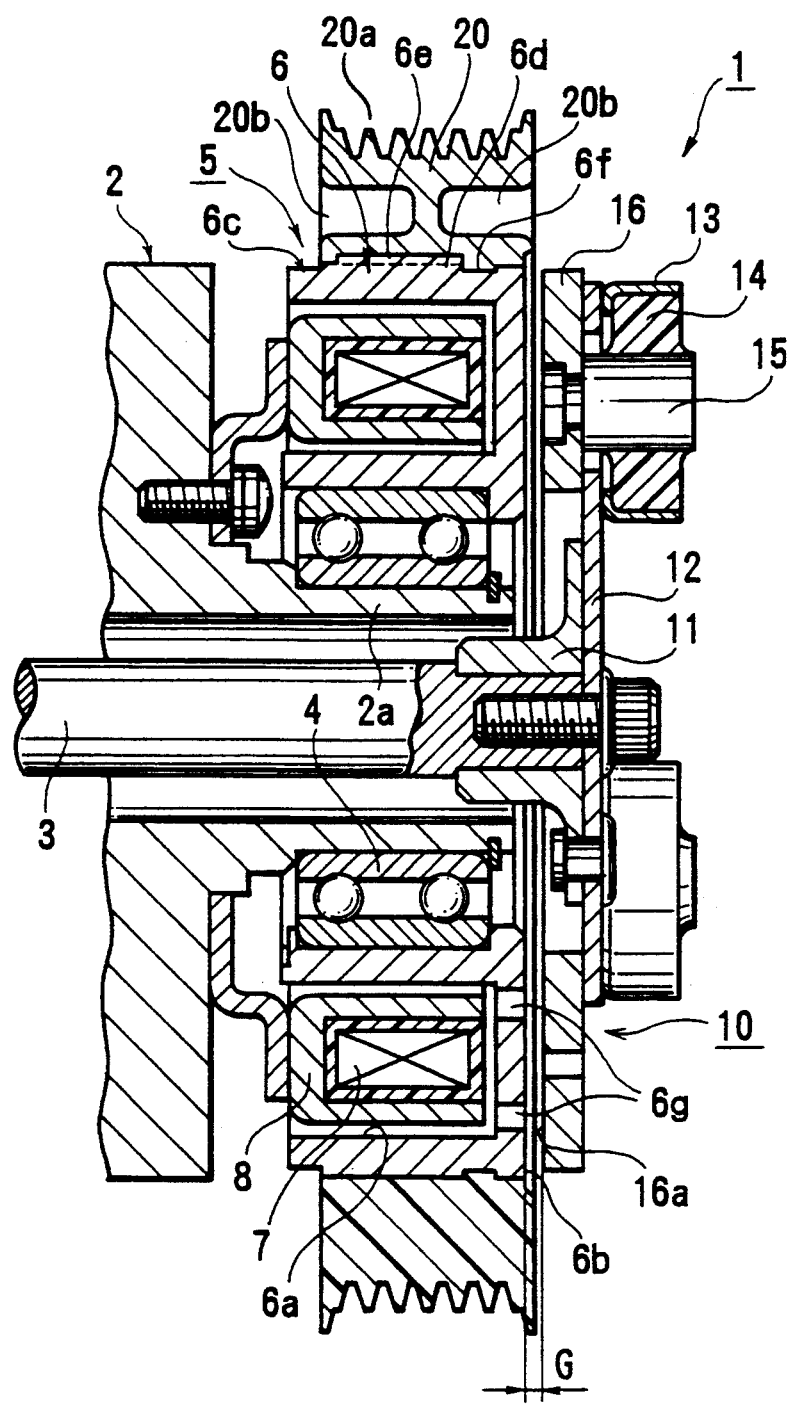
FIG. 1 a schematic sectional view showing an electromagnetic clutch according to an embodiment of the present invention.
Figure 2:
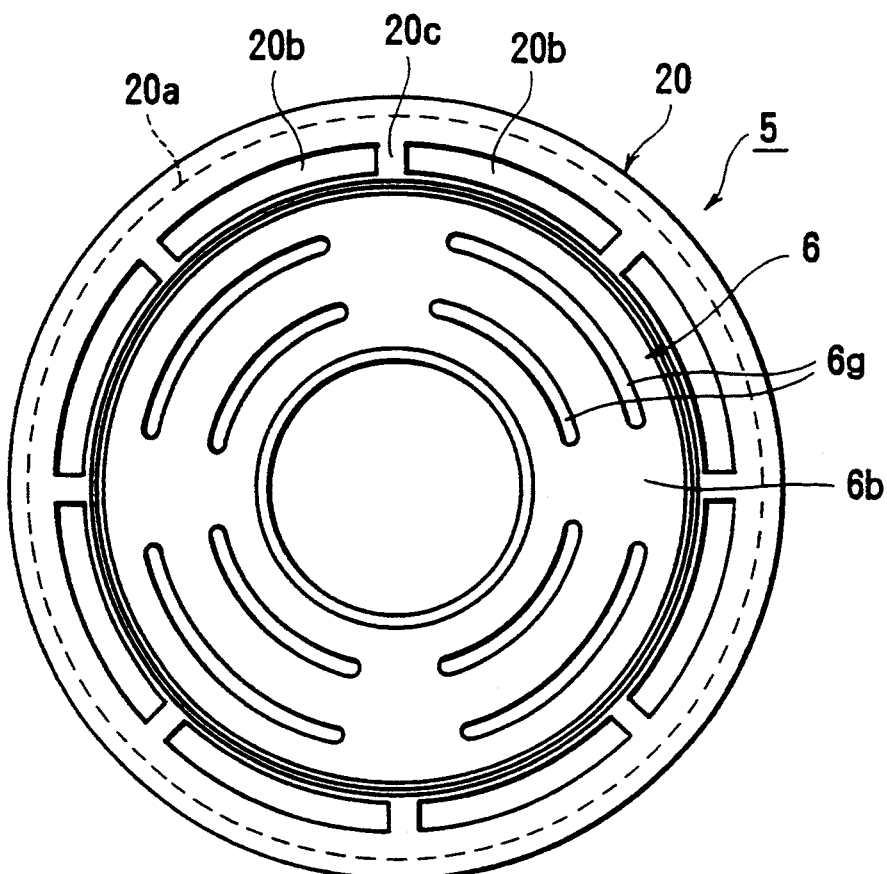
FIG. 2 is a schematic front view showing a rotor assembly consisting of a rotor and a resin pulley.
Figure 3:
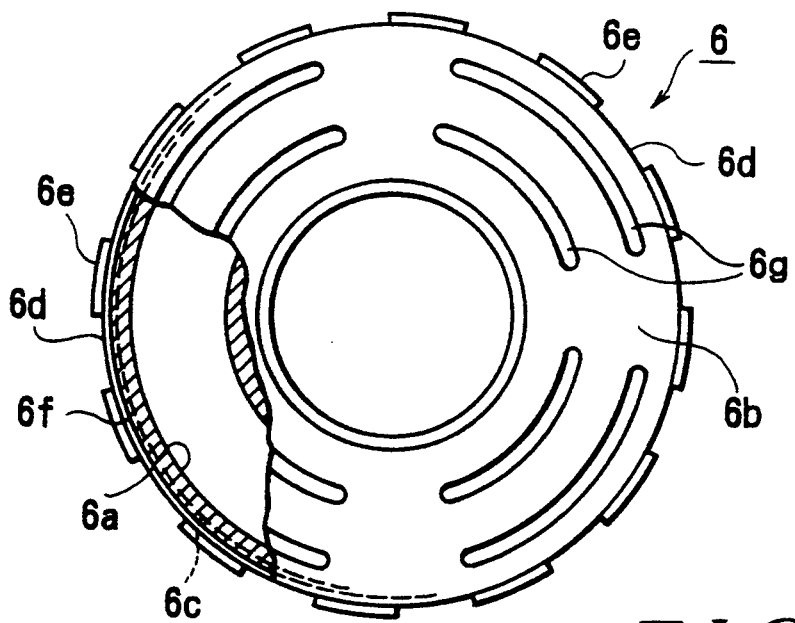
FIG. 3 is a schematic plan view of the rotor.

FIGS. 1 to 3 show an electromagnetic clutch according to an embodiment of the present invention. A schematic arrangement of an electromagnetic clutch denoted by reference numeral 1 as a whole will be briefly described first with reference to FIGS. 1 to 3. For example, the electromagnetic clutch 1 is mounted in part of a housing 2 of a compressor for an automobile air-conditioner and is designed to transmit the rotation of an engine (not shown) to a rotating shaft 3 of the compressor to be driven. A rotor assembly 5 is rotatably supported on a cylindrical portion 2a of the compressor housing 2 through a bearing 4. A field core 8 incorporating an electromagnetic coil 7 fixed to the compressor housing 2 through a mounting plate is fitted in an annular groove 6a of a rotor portion 6.

An armature assembly 10 is mounted on the rotating shaft 3 of the compressor. The armature assembly 10 comprises an armature hub 11 fitted on the rotating shaft 3 with serration, a stopper plate fixed to the hub 11 with rivets by caulking, a damper cover 13 concentrically fusion-bonded in a hole formed in the plate 12, a driving pin 15 inserted in the hole of the plate 12 and the cover 13 and having a damper rubber 14 fixed on its outer surface, an armature 16 to which the distal end of the driving pin 15 is fixed by caulking, and the like. A friction surface 16a of the armature and a friction surface 6b of the rotor portion 6 are arranged to oppose each other through a gap G.

As is known, in the electromagnetic clutch 1, a belt or the like is looped around a pulley portion 20 of the rotor assembly and a crank pulley (not shown) of the engine to transmit the rotation of the engine to the rotor assembly, and the armature 16 is magnetically attracted to the rotor portion 6 owing to the magnetic flux of the electromagnetic coil 7, thereby selectively rotating the rotating shaft 3 of the compressor.

The present invention is characterized by the following arrangement of the rotor assembly 5 in the above-described electromagnetic clutch 1. As described below with reference to FIGS. 1 to 3, the rotor assembly is manufactured by cold forging, and the synthetic resin pulley portion 20 is integrally formed on the outer circumferential surface of the rotor portion 6 by insert molding. In this case, the rotor portion 6 is formed such that a rod member is formed into an annular member, and the annular member is processed by cold forging, as disclosed in, e.g., Japanese Patent Laid-Open No. 55-8301. This technique is different from the above-described conventional technique in the shape of a die. More specifically, a stepped portion is formed on the outer circumferential surface of the rotor portion 6 to form a small-diameter portion 6c on the opening side and a large-diameter portion 6d on the friction surface 6 side. In addition, a plurality of projections 6e are formed on the outer circumferential surface of the large-diameter portion 6d to extend in the axial direction, as shown in FIGS. 1 to 3.

As is apparent from FIG. 1, the rotor portion 6, which has undergone cold forging, has an annular groove 6f formed in the large-diameter portion 6d by cutting. Note that reference numeral 6g in FIGS. 1 to 3 denotes an elongated hole which is punched/formed in the friction surface 6b by press working to allow the magnetic flux to bypass.

Subsequently, electropainting is performed on the entire surface of the rotor portion 6 processed in this manner. In this electropainting, after surface treatment is performed with respect to the rotor portion 6 by degreasing and forming, the resultant structure is placed in an electrodeposition bath, and coating particles are attracted to the rotor portion 6 due to the electrical force of a DC current, thereby forming a coating film. After this electropainting, the rotor portion 6 is removed from the electrodeposition bath and is washed with water. The rotor portion 6 is then air-blown and is generally baked at a surface temperature of 150° to 200° C., thereby performing an anti-corrosion treatment for the rotor portion 6.

Subsequently, the synthetic resin pulley portion 20 is integrally formed on the rotor portion 6 by insert molding. The pulley portion 20 has a substantially cylindrical shape. A belt bearing portion 20a consisting of a plurality of V-grooves is formed in the outer circumferential surface of the pulley portion 20. In addition, a plurality of recess portions 20b are formed in the two side surfaces of the pulley portion 20b in the axial direction. Ribs 20c are formed between these recess portions 20b. The pulley portion 20 and the rotor portion 6 are engaged with each other in the axial direction and the direction of rotation with the projections 6e and the groove 6f of the rotor portion 6 so that the pulley portion 20 is integrally fitted on the circumferential surface of the large-diameter portion 6d of the rotor portion 6.

As described above, in insert molding of the above-described pulley portion 20 with a resin, in order to improve the fluidity of the resin, the temperature of a mold must be raised. However, as described above, since the anti-corrosion treatment for the rotor portion 6 is performed by electropainting, i.e., a technique different from a general plating process, no problems are posed in terms of quality, e.g., changes in color or deterioration in gloss on the surface of the rotor portion 6. Note that even if the pulley portion 20 is formed, by insert molding, on the rotor portion 6 whose surface is treated by galvanization or the like, the rotor assembly 5 which is satisfactory in terms of quality can be obtained. In this case, however, strict quality control is required.

According to the rotor assembly 5 obtained by integrally forming the rotor portion 6 and the pulley portion 20 in the above-described manner, the rotor assembly 5 is completed by pressing the bearing 4 into an inner hole so as not to be removed therefrom while only the friction surface 6b is formed by cutting.

In the rotor assembly 5 obtained in this manner, the synthetic resin pulley portion 20 can be integrally formed, by insert molding, on the rotor portion 6 having the plurality of projections 6e formed on the outer circumferential surface by component casting. Therefore, the projections 6e for integrally coupling the resin pulley portion 20 can be formed unlike in the conventional technique without performing component rolling, knurling, cutting, and the like. This can greatly improve the productivity.

The present invention is not limited to the structure of the embodiment described above. In addition to the field of invention, the shape, structure, and the like of each component can be changed as needed. Various modifications of the invention can also be made.

As has been described above, according to the electromagnetic clutch of the present invention, a synthetic resin pulley is integrally formed, by insert molding, on a rotor having a plurality of projections formed on its outer circumferential surface by component coating. With this arrangement, in spite of the simple, low-cost arrangement, since the projections and the like are formed, component rolling, knurling, cutting, and the like as in the conventional technique need not be performed. This provides various advantages, e.g., a great improvement in productivity of rotor assemblies.

What is claimed is:

1. In an electromagnetic clutch comprising an armature mounted on a rotatable driven shaft and a rotor assembly mounted for rotation about an axis of said driven shaft, said rotor assembly including a rotor member having an outer circumferential surface and a pulley member, said pulley member being mounted on a outer circumferential surface of said rotor member and being arranged to be driven by a driving mechanism, said rotor member including a magnet for providing magnetic force coupling with said armature; the improvement wherein said rotor member comprises a cast member having an outer circumferential surface with a first portion having a first diameter and a second portion having a second diameter larger than said first diameter, said outer circumferential surface having an uneven surface shape constituted by a plurality of projections on said second portion of the outer circumferential surface, said projections extending both axially and radially outwardly, and wherein said pulley member comprises a molded member integrally formed on the outer circumferential surface of said rotor member by insert molding with said projections extending into said pulley member to provide engagement therebetween both axially and circumferentially to prevent relative motion between said rotor member and said pulley member.

2. The invention of claim 1 wherein said pulley member is molded from a synthetic resin.

3. The invention of claim 1 wherein said projections are distributed about the entire circumferential surface of said rotor member.

4. The invention of claim 1 wherein said outer circumferential surface of said rotor member includes a circumferential groove positioned immediately adjacent said projections.

5. The invention of claim 1 wherein said first portion is located adjacent one end of said rotor member.

6. The invention of claim 1 wherein said second portion is located centrally of said outer circumferential surface.

7. The invention of claim 1 wherein said first portion is located adjacent one end of said rotor member, said second portion is located centrally of said outer circumferential surface and has a first edge adjacent a inner boundary of said first portion and a second edge; and wherein said outer circumferential surface of said rotor member includes a circumferential groove located adjacent said second edge.

* * * * *